(12) United States Patent
Wells

(10) Patent No.: US 7,971,611 B1
(45) Date of Patent: Jul. 5, 2011

(54) COMBINATION DUST EXTRACTOR AND SUPPORT PLATE FOR TABLE MOUNTED ROUTERS

(76) Inventor: William W. Wells, Olympia, WA (US)

(*) Notice: Subject to any disclaimer, the term of this patent is extended or adjusted under 35 U.S.C. 154(b) by 0 days.

(21) Appl. No.: 12/928,000

(22) Filed: Dec. 1, 2010

Related U.S. Application Data

(60) Provisional application No. 61/455,371, filed on Oct. 18, 2010.

(51) Int. Cl.
*B27C 5/00* (2006.01)
*B27G 21/00* (2006.01)
(52) U.S. Cl. ............... 144/136.95; 144/252.2; 144/286.5
(58) Field of Classification Search ............ 144/136.95, 144/252.1, 252.2, 286.1, 286.5; 409/137, 409/182; 83/100
See application file for complete search history.

(56) References Cited

U.S. PATENT DOCUMENTS

| | | | |
|---|---|---|---|
| 4,051,880 A | 10/1977 | Hestily | |
| 4,201,256 A | 5/1980 | Truhan | |
| 4,409,699 A | 10/1983 | Moorehouse | |
| 4,738,571 A | 4/1988 | Olson et al. | |
| 4,742,855 A | 5/1988 | Hartley | |
| 4,750,536 A | 6/1988 | Grisley | |
| 4,821,365 A | 4/1989 | Charters | |
| 5,289,861 A * | 3/1994 | Hedrick | 144/135.2 |
| 5,503,203 A | 4/1996 | Stornetta | |
| 5,553,644 A | 9/1996 | Adams | |
| 5,584,620 A | 12/1996 | Blickhan et al. | |
| 5,611,378 A | 3/1997 | Brazell | |
| 5,993,124 A | 11/1999 | Cooper et al. | |
| 6,146,066 A | 11/2000 | Yelton | |
| 6,237,657 B1 | 5/2001 | Qian | |
| 6,305,447 B1 | 10/2001 | Rousseau | |
| 6,520,224 B2 * | 2/2003 | Smith | 144/135.2 |
| 6,997,222 B2 | 2/2006 | Rosendahl | |
| 7,089,978 B2 * | 8/2006 | Karkosch et al. | 144/136.95 |
| 7,114,538 B2 * | 10/2006 | Rosendahl | 144/136.95 |
| 7,290,967 B2 | 11/2007 | Steimel et al. | |
| 2003/0205292 A1 * | 11/2003 | Smith | 144/252.1 |
| 2010/0089497 A1 | 4/2010 | Keenan | |

* cited by examiner

*Primary Examiner* — Shelley Self
(74) *Attorney, Agent, or Firm* — Puget Patent; Michael Gibbons

(57) ABSTRACT

The combination waste dust extractor and support plate is intended to be used in combination with a conventional woodworking router when the router is used in an inverted position for bench or table use. The apparatus includes a router support plate with the dust extraction feature built into and included with this support plate. The combination support plate and dust extractor is affixed to the router and then both are suspended under the surface of a work table. The dust extraction feature is built into and included with the support plate as follows: within the plate is an internal chamber connecting the router bit opening on the top surface of the plate with an outlet at one corner of the bottom of the plate. A standard shop vacuum is attached to a hose fitting connected to the outlet. The attached shop vacuum creates suction around and beneath the router bit, drawing dust and particles through the chamber and into the attached shop vacuum. The combination waste dust extractor and support plate can be mounted to conventional routers by drilling holes through the plate and attaching the router with flat head machine screws.

15 Claims, 3 Drawing Sheets

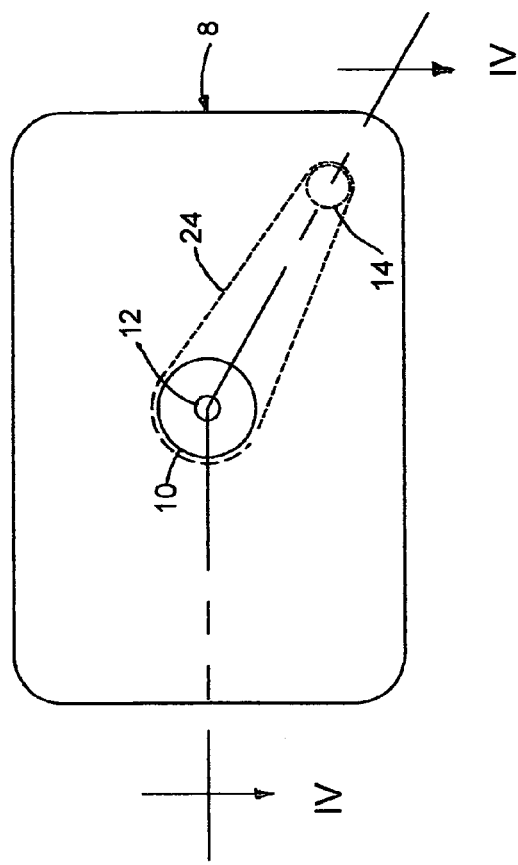
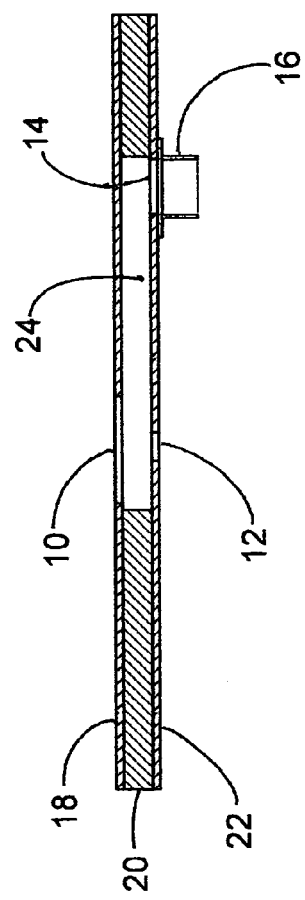
Fig. 3
Fig. 4

COMBINATION DUST EXTRACTOR AND SUPPORT PLATE FOR TABLE MOUNTED ROUTERS

CROSS-REFERENCE TO RELATED APPLICATIONS

This application claims the benefit of provisional patent application No. 61/455,371 filed 2010 Oct. 18 by the present inventor.

BACKGROUND OF THE INVENTION

My combination dust extractor and support plate for table mounted routers, relates generally to dust extraction systems for shop woodworking tools. More specifically, the invention relates to dust extraction systems and support plates for use with table mounted woodworking routers.

A router is a woodworking power tool utilizing a high speed cutting bit to trim and shape a workpiece. In its basic form, the router is used as a hand-held tool in a vertical position with the bit downward, shaping a stationary workpiece. A router may also be mounted in an inverted position for table or bench use. In this application, the router is mounted to a support plate, which allows the router and attached support plate to be set into a recess in a work table with the bit protruding above the table top. This allows the workpiece to be passed over the stationary router, rather than passing the router over a stationary workpiece.

The conventional router support plate is a simple rectangular plate of solid metal, wood, or plastic. The router is attached under this plate, which has a hole at its center through which the router bit protrudes upward. The only purpose of this support plate has been to support the router beneath the work table. The support plate is often of a universal design, allowing attachment of various router models by drilling through the plate in a pattern to match the specific routers dimensions.

One characteristic typical of all woodworking routers is the large amount of waste wood dust and particles generated during operation. Collecting and extracting this waste material has been a continuing problem, and prior art systems designed to do so have not been totally successful.

Prior art router dust extraction systems for table mounted routers are of three types:
  a) systems mounted above the router table that comprise a fence or other device with a hollow chamber and an opening near the router bit. When a vacuum source is attached to the hollow chamber, dust generated during router operation can be extracted from above the table.
  b) systems that comprise a dust cup which attaches beneath the router table or support plate, directly under the router bit opening. When a vacuum source is attached to the dust cup, dust can be extracted from the router bit opening. A variation of this type comprises an enclosure which surrounds the router. When a vacuum source is attached to the enclosure, negative pressure within the enclosure pulls dust from the router bit opening into the attached vacuum source.
  c) a combination of systems (a) and (b).

Prior art dust extraction systems designed to extract dust from above the router table (type (a) described above) are ineffective when the workpiece covers the router bit and bit opening, such as when making a dado cut. In this mode of operation, above-table extraction systems have no means for collecting dust because the router bit, and therefore all generated dust, is isolated from the extraction system. Also, above-table systems require hardware and a vacuum hose mounted on the work table surface which can interfere with router operation.

Prior art systems designed to extract wood dust from below the router table (type (b) described above) are capable of extracting dust generated while making dado cuts, but suffer from other deficiencies. These systems limit vertical travel of the router, making above-table bit changing difficult or impossible; impede ventilation air flow from the router motor, thus risking overheating of motor; and the crowding of a vacuum hose and dust cup between the router motor and bit opening is an awkward arrangement. Some below-table systems are of proprietary design thus not universally adaptable to all woodworking routers. Location of the dust cup compromises dust extraction effectiveness because the suction is remote from the router bit, also suction is partially obstructed by the bottom of the router support plate.

Prior art systems comprising a combination of above-table and below-table extraction systems (type (c) described above) exhibit many of the problems that are present in their specific types. In addition, these "combination" extraction systems are more complex due to additional equipment installed above, below, and around the router, thus interfering with router operation. Combination systems often require larger non-standard vacuum systems. Although there have been many dust extraction systems developed and marketed for woodworking routers used as hand-held tools, fewer systems have been developed specifically for table mounted routers. Relevant examples of prior art systems designed to extract dust from woodworking routers include the following:

U.S. Pat. No. 4,051,880 (Hestily) discloses a hand-held router combined with a dust collection feature, not a dust collection system for table mounted routers. It consists of a portable electric router having a dust chamber formed below a motor mounted to a base having two handles one of which connects the chamber to a blower and dust bag fixed to the top of the motor. Additionally, the device described is a proprietary router and not for use with conventional routers, thus is not adaptable to existing routers.

U.S. Pat. No. 4,738,571 (Olson et al.) discloses a system intended for the collection of dust from a hand-held router. It consists of a base with a dust port, a sub-base having a large cavity attached to the base, with both attached to a router. While this apparatus conceivably could be attached to the underside of a work table, it appears that the small hole in the base will limit the depth of some cuts, as collets of routers will not pass through it. In addition, provisions are not evident for the large variety of different dimension router bases that are currently in production, therefore this system would not be universally adaptable.

U.S. Pat. No. 5,553,644 (Adams) is a system intended for a table-mounted router, and comprises a fence of hollow rectangular configuration defining a chamber that is connectable to a vacuum source for removal of dust produced by a cutting tool such as a router. The system appears to be adaptable to a variety of router tables but is capable of collecting dust from only the top of the table surface, thus has the characteristics of type (a) above. It does not have any means for collecting dust from below the router table, therefore ineffective when the workpiece covers the router bit and bit opening, such as when making a dado cut.

U.S. Pat. No. 5,611,378 (Brazell) discloses a router table assembly with a tiltable table subassembly that allows variation in positioning the router and includes a router mounting plate specifically designed for the table and a unique table design. The table and mounting plate include vacuum channels with a tube connectable to a vacuum source. The design of the channels is such that slivers of wood are likely to clog the dust escape route and render the system inoperable. Aside from this issue, the channels do not appear to be of sufficient height to accommodate many of the mid and larger size cutting tools that are currently on the market. An additional limitation is the fact that the dust collection system is built into the table and is not adaptable to the many other router tables and router support plates currently on the market, thus is not a universal fit.

U.S. Pat. No. 5,993,124 (Cooper) describes a system that includes a router sub-base adapted for connection to a hand-held router. The system includes lower and upper vacuum flow paths configured to evacuate dust from within and beneath the router sub-base. This system is designed for cutting edges of work pieces by hand and not for use with a table mounted router, nor is it attachable to a router table. The design is such that wood dust is collected to the rear side of the router away from the cutting tool, with dust and particles likely escaping from the front side of the cutting operation. There is no provision to collect dust coming from this area. In addition, with this system installed on a router, dust collection will not be possible for dado types of cuts and it is not a universal fit for routers.

United States Patent Application 2010/0089497 (Keenan) discloses a dust collector for use with table mounted routers. The system includes both above-table and below-table dust collection devices, therefore is a system with the characteristics of type (c) described above. This dust collector system includes a flexible cup device attachable to the underside of the router table, with a hose opening on the cup connectable to a shop vacuum. Users of collection systems which incorporate similar devices report several problems with these "dust cups". They find it necessary to remove the dust cup in order to change router bits; they encounter difficulty keeping the dust cup and attached hose connected beneath the router; they find that particles can plug the opening to the vacuum hose; and they find that setup time is lengthy. The system also includes a fence with a dust port opening, also connected to the shop vacuum. This system, and others of similar design, are unnecessarily complex and require multiple vacuum hoses which can interfere with the router operation. A larger non-standard shop vacuum system is often required for this type system.

Therefore, a need exists to provide a waste dust extraction system that is adaptable to any conventional woodworking router when used in table mounted operation; which can be operated in combination with a standard shop vacuum; is effective in extracting dust produced in any routing operation, and does not interfere with router operation or router bit changing. There is further need for an uncomplicated stand-alone system which does not require additional extraneous dust extraction equipment.

BRIEF SUMMARY OF THE INVENTION

My combination dust extractor and support plate is an apparatus combining a router support plate with a highly effective system for extracting waste wood dust from an attached woodworking router, when the router is used in an inverted position for table use. The apparatus comprises a flat generally rectangular plate constructed of multiple layers, assembled in sandwich construction, under which any conventional router can be suspended. The plate is constructed so that it is easily adaptable to all commercially available woodworking routers. An internal chamber within a center layer of the plate connects a router bit opening in a top layer of the plate with a vacuum outlet at one corner of a bottom layer of the plate. This chamber serves as a duct to convey the waste dust from the router bit opening to an attachable standard shop vacuum.

A primary object of my dust extractor/support plate is to provide an apparatus with maximum effectiveness as regards the extraction of waste wood dust. This object is achieved in part by creating a strong suction close to the dust generated by a router bit. Another object is to provide an uncomplicated, compact, economical router support plate and dust extraction system of simple design. This object is attained by creating the dust extraction feature in common with the plate which supports the router within a work table. A further object is for the apparatus to be universally adaptable to all conventional routers. This object is achieved by making my dust extractor/support plate out of an easily machinable material to allow attachment of any conventional router by simply drilling mounting holes in the plate and bolting the router to the underside of the plate. An additional object is to provide an extraction system which effectively removes waste dust from around and under the router bit when making any type of cut, thereby making additional dust collection equipment unnecessary.

Accordingly, my dust extractor/support plate as outlined above provides a simple and effective apparatus for the extraction of waste dust created when using a table mounted router; eliminates need for conventional above-table and/or under-table extraction systems; provides a plate from which to support a router within a work table; and is universally attachable to conventional routers. A primary design feature which allows accomplishment of the above stated objectives is creating the dust extraction feature within the router support plate, as opposed to prior art dust extraction equipment which is mounted above and/or below the router table. Having the dust extraction feature built into the router support plate eliminates extraneous equipment which are ineffective and can interfere with operation of the router.

Following is a summary of features of my dust extractor/support plate which provide advantages over the prior art of table mounted router dust extraction:

a) Viewed from above, my dust extractor/support plate is no different from a conventional router support plate. This is an advantage since when it and the attached router are installed in a work table there are no obstructions caused by externally attached dust extraction equipment. The only attachment is a vacuum hose connected at one bottom corner.

b) My dust extractor/support plate is applicable to every commercially available woodworking router model. The only modification required to attach it to a conventional router is the drilling of mounting holes to match the mounting bolt pattern on a specific router face. This is no different from attaching a router to many conventional router support plates.

c) The dust extraction feature is based upon vacuum induced airflow within the plate. Dust and particles are pulled by vacuum into an opening around and under the router bit, then through an internal chamber within the plate, where they are then discharged into a connectable standard shop vacuum. Highly effective dust extraction is accomplished in part by a robust airflow created by eliminating obstructions within the flow path, and by design of a large internal chamber. Also, making the router spindle and collet opening as small as possible, in order to minimize loss of vacuum, increases effectiveness. The dust extraction effectiveness is further enhanced by positioning suction close to waste dust generated at the router bit. Prior art below-table extraction systems position a dust cup or similar device beneath the router table, or an enclosure around the router, therefore the suction is remote from the router bit and partially obstructed by the bottom of the router support plate.

d) My dust extractor/support plate is particularly effective in routing operations where the workpiece covers the entire bit, such as making a dado cut, since all above-table dust extraction methods are ineffective in this operation.

e) A major benefit of my dust extractor/support plate is its simplicity when compared with prior art router table dust extraction systems.

f) Due to strong suction created near the router bit, dust extraction is extremely effective, therefore eliminating need for additional dust extraction equipment.

BRIEF DESCRIPTION OF THE INVENTION

In the drawings which illustrate an example embodiment for carrying out my combination dust extractor and support plate:

FIG. 3 is a top view, with dashed lines showing the internal chamber extending from router bit opening to outlet.

FIG. 4 is a cross sectional view taken through a section indicated in FIG. 3

DRAWING REFERENCE NUMERALS

Figure 2:
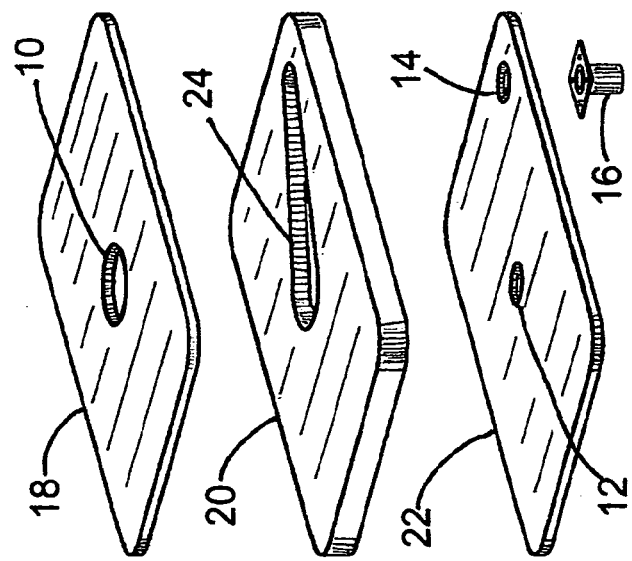
FIG. 2 is an exploded view displaying the sandwich type construction.

3 Conventional woodworking router (prior art, shown for illustration)
5 Router bit (prior art, shown for illustration)
7 Router collet (prior art, shown for illustration)
8 My combination dust extractor and support plate (the present invention)
9 Work table (prior art, shown for illustration)
10 Router bit opening, and inlet to internal chamber
12 Router spindle and collet opening
14 Outlet
16 Vacuum connection
18 Top layer
20 Center layer
22 Bottom layer
24 Internal chamber
25 Hose to shop vacuum (prior art, shown for illustration)
26 Countersunk holes for attachment of conventional router

DETAILED DESCRIPTION OF THE INVENTION

The following description should be read with reference to the drawings. The drawings depict a specific example embodiment and are not intended to limit the scope of my dust extractor/support plate. Although examples of construction, dimensions, materials and manufacturing processes are described, those skilled in the art will recognize that many of the examples have suitable alternatives that may be utilized.

An essential feature of my invention, that of providing a large chamber within a router support plate as a means of conveying dust and particles away from the router bit, is illustrated in the figures. It can be seen that this feature is built into and in combination with the support plate which suspends the router within the work table. Also, it should be noted that several components are shown for illustrative purposes and are not part of the example embodiment. These illustrative components are identified by odd-numbered reference numerals.

Figure 1:
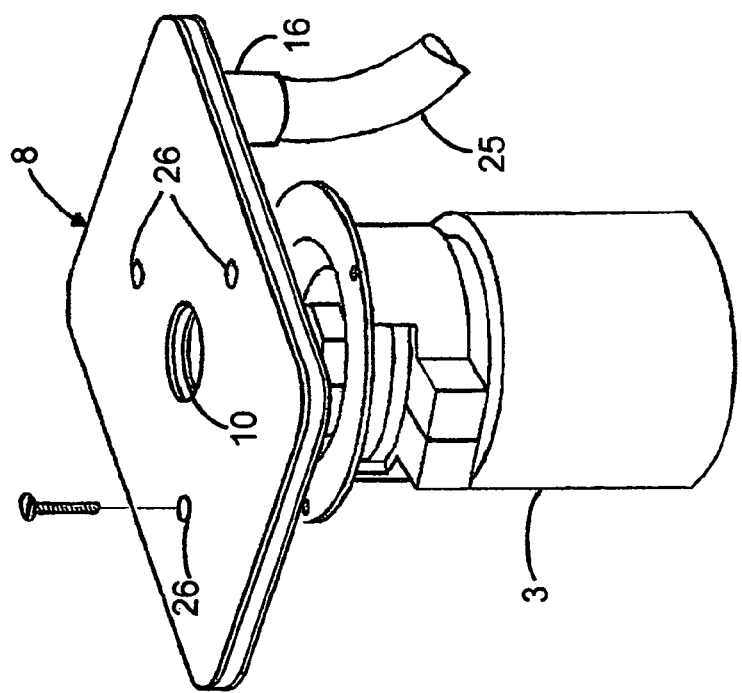
FIG. 1 is a simplified perspective view, illustrating a method of attachment to a conventional router and attachable vacuum hose.

FIG. 1 is a perspective exploded view depicting an attachable conventional woodworking router 3 in accordance with the example embodiment of my dust extractor/support plate 8. A router bit opening 10 of circular shape permits a router bit 5 (see FIG. 5) to protrude upwardly above a top surface of this embodiment 8. The opening 10 also serves as an inlet to an internal chamber 24, which in turn connects with a circular outlet 14 (see FIG. 3). The diameter of opening 10 may be no more than 12.7 mm (½ inch) greater than the diameter of the largest router bit contemplated. In the example embodiment, the diameter of opening 10 is 50.8 mm (2 inches) for use with router bits up to 38.1 mm (1½ inch) diameter. The router 3 can be secured to the example embodiment 8 with a number of flat head machine screws. A number of countersunk bolt holes 26 can be disposed through the plate, these holes drilled in a pattern to match the arrangement of threaded mounting holes in a specific router. These bolt holes can be arranged so that no hole is drilled through chamber 24. An attachable vacuum hose 25 is connected to a vacuum connection 16 using a clamp type of mechanism (not shown). Vacuum connection 16 may be a commercially available device commonly used to connect a flexible hose to a shop built apparatus; in the example embodiment vacuum connection 16 is connectable to a vacuum hose of 50.8 mm (2 inches). The other end of vacuum hose 25 is attached to a standard shop vacuum cleaner (not shown).

FIG. 2 is an exploded view showing a sandwich type construction and additional details of the example embodiment. A top layer 18 may be fabricated from a thin sheet of plastic or similar material; in this embodiment, the top layer 18 is fabricated from phenolic sheet of 3.2 mm (⅛ inch) thickness. Phenolic sheet is a strong, dense material made by applying heat and pressure to layers of paper or glass cloth impregnated with synthetic resin, and is commercially available. Phenolic sheet is easily machinable and drillable. The opening 10 is disposed by drilling or cutting through the top layer 18. A center layer 20 may be fabricated from a manufactured wood product or similar material; in this example embodiment, center layer 20 is fabricated from plywood of 12.7 mm (½ inch) thickness. The internal chamber 24 may be cut or routed into the center layer 20. A bottom layer 22 may be fabricated from a thin sheet of plastic or similar material; in this embodiment, the bottom layer 22 is fabricated from phenolic sheet of 3.2 mm (⅛ inch) thickness. Disposed in the bottom layer 22 is a circular router spindle and collet opening 12, concentric with opening 10, which allows passage of a router spindle and collet 7 (see FIG. 5). Attached below the outlet 14, disposed through the bottom layer 22, is the vacuum connection 16. The three sandwiched layers (top layer 18, center layer 20, and bottom layer 22) are glued together using a permanent adhesive such as epoxy. The sandwich construction with impermeable, durable, and smooth top and bottom layers provides a strong support plate resistant to warping. The vacuum connection 16 may be attached with wood screws or other fasteners.

FIG. 3 is a top view showing the generally rectangular shape of the top surface. In this embodiment, the top surface has dimensions of 210 mm×300 mm (8¼ inches by 11¾ inches) with rounded corners of radius 19 mm (¾ inch), which are the same dimensions and shape as many conventional router support plates now widely available, although other configurations and dimensions are possible. As a means to maximize vacuum induced airflow from opening 10, the diameter of the router spindle and collet opening 12 is no greater than required to allow passage of collet 7; in this embodiment, the diameter of opening 12 is 19 mm (¾ inch); suitable for a collet of 15.9 mm (⅝ inch) diameter, although opening 12 may be larger to accommodate larger router spindles and collets. Also in this embodiment, the diameter of outlet 14 is 38.1 mm (1¼ inches). Dotted lines indicate the internal chamber 24 which extends through center layer 20 from opening 10 to outlet 14; therefore creating a duct for conveying waste dust to the attachable shop vacuum. It can be seen that both ends of chamber 24 are curved. In this embodiment, the curved end of chamber 24 terminating at opening 10 has a radius of 31.8 mm (1¼ inches); the curved end terminating at outlet 14 has a radius of 19 mm (¾ inch).

FIG. 4 is a cross sectional view, taken through a section indicated in FIG. 3. This view clearly shows the sandwich construction of layers 18, 20, and 22. In this view can be seen opening 10, router spindle and collet opening 12, and vacuum connection 16. Also shown is the internal chamber 24 connecting opening 10 with outlet 14.

Figure 5:
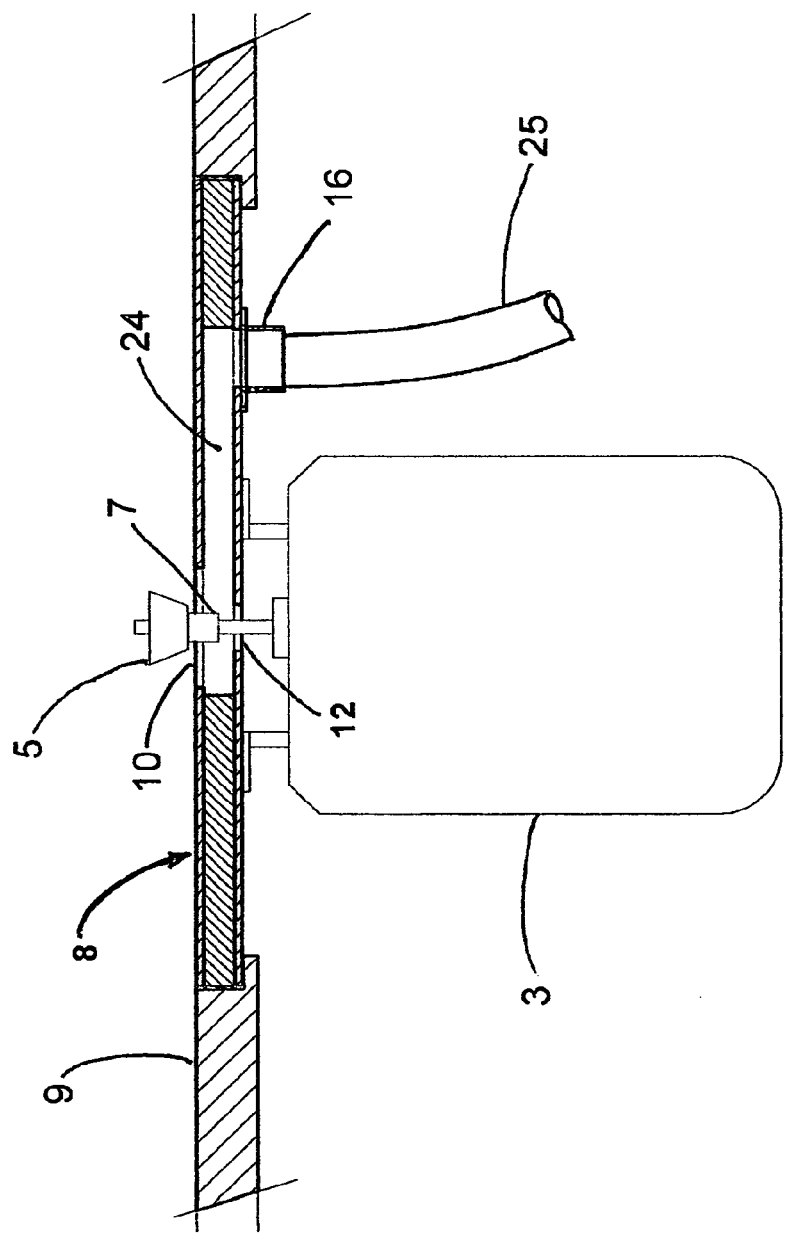
FIG. 5 is a sectional view similar to FIG. 4, however including an illustrative work table, attached router, and vacuum hose.

FIG. 5 is a cross sectional view also taken through the section indicated in FIG. 3; however this view also includes an illustrative work table 9 and a typical method of supporting the example embodiment 8. Shown in schematic form are attachable vacuum hose 25, collet 7, and router bit 5. Also in this view can be seen opening 10, router spindle and collet opening 12, and vacuum connection 16. The internal chamber 24 is shown connecting opening 10 with outlet 14. The conventional woodworking router 3 is shown in schematic form attached under the example embodiment 8. A specific router can be attached using a number of flat head machine screws (see FIG. 1); these screws inserted through a number of countersunk bolt holes 26 disposed through the example embodiment, these holes drilled in a pattern to match the arrangement of threaded mounting holes in the specific router base. Similarly, holes for router spindle and collet opening 12, and router bit opening 10, may be drilled or cut to meet dimensional requirements of the specific router. These holes may be drilled by the end user; although other means are possible.

Operation

The attached router is operated in a manner no different from the operation of conventional table mounted routers in present use. There is no equipment to be installed neither above nor under the work table, except for a single vacuum hose connected in a location remote from the router. To operate, the router is attached under my dust extractor/support plate 8, using flat head machine screws, then this assembly is set into a supporting recess in the work table 9, and a standard shop vacuum and hose is attached to vacuum connection 16. When attached router 3 and shop vacuum (not shown) are turned on and operation begins, dust and particles generated by the router bit 5 are drawn by vacuum induced air flow through the opening 10, conveyed through the internal chamber 24, and then discharged through outlet 14 into the attached shop vacuum and hose connected to vacuum connection 16. The design details described above for the example embodiment, specifically design of opening 10, opening 12, outlet 14, and chamber 24, create a flow of sufficient velocity to prevent plugging. The robust suction developed around the router bit 5 virtually eliminates escaping dust and particles therefore making additional dust extraction systems unnecessary.

For these reasons, my dust extractor/support plate represents a significant advancement in the art, especially in simplicity of design, effectiveness of operation, and universal applicability, which has substantial commercial merit.

Having thus described an example embodiment of my invention, those of skill in the art will readily appreciate that other embodiments may be made and used which fall within the scope of the claims attached hereto. Numerous advantages have been set forth in the foregoing description. It will be understood that this disclosure is, in many respects, only illustrative. Changes may be made in details, particularly in matters of shape, size and arrangement of parts without exceeding the scope of my combination dust extractor and support plate.

I claim:

1. A combination router support plate and dust extractor comprising:

a flat, generally rectangular center layer, wherein the center layer has a pear-shaped aperture disposed through the center layer, the pear-shaped aperture further comprising:

a large end of the pear-shaped aperture;

a small end of the pear-shaped aperture opposite the large end of the pear-shaped aperture;

wherein the large end of the pear-shaped aperture describes a circular arc having a radius;

wherein the small end of the pear-shaped aperture describes a circular arc having a radius that is smaller than the radius of the circular arc of the large end of the pear-shaped aperture;

wherein the circular arc described by the large end of the pear-shaped aperture forms a portion of a circle, said circle if fully circumscribed being a large circle centrally disposed through the layer;

wherein the circular arc described by the small end of the pear-shaped aperture forms a portion of a circle, said circle if fully circumscribed being a small circle disposed through the layer near a corner of the layer;

wherein the circular arc described by the large end of the pear-shaped aperture and the circular arc described by the small end of the pear-shaped aperture are joined by straight lines that complete the pear-shaped aperture;

wherein the pear-shaped aperture is symmetrical about an axis extending from the center of the circular arc described by the large end to the center of the circular arc described by the small end;

a flat, generally rectangular second layer disposed adjacent one side face of the center layer to follow the contour thereof, the second layer further comprising:

a circular aperture centrally disposed through the second layer concentric with the large circle partially formed by the circular arc described by the large end of the pear-shaped aperture of the center layer;

an interior face disposed adjacent the center layer;

an exterior face disposed opposite the face adjacent to the center layer;

a flat, generally rectangular third layer disposed adjacent the opposite side face of the center layer to follow the contour thereof, the third layer further comprising:

a circular aperture centrally disposed through the third layer concentric with the large circle partially formed by the circular arc described by the large end of the pear-shaped aperture of the center layer, the circular aperture having a radius smaller than the circular arc described by the large end of the pear-shaped aperture of the center layer;

a circular aperture disposed through the third layer concentric with the small circle partially formed by the circular arc described by the small end of the pear-shaped aperture of the center layer;
an interior face disposed adjacent the center layer;
an exterior face disposed opposite the face adjacent to the center layer;
the plurality of layers being machinable to permit mounting of a conventional woodworking router with a plurality of threaded fasteners to the exterior face of the third layer;
the third layer further permitting engagement to the exterior face of a connectable hose of a vacuum source, said engagement being concentric with the circular aperture disposed through the third layer concentric with the small circle partially formed by the circular arc described by the small end of the pear-shaped aperture of the center layer;
wherein a circular channel is disposed through the plurality of layers, the circular channel comprising the centrally disposed circular aperture of the second layer, concentric with the large circle partially formed by the circular arc described by the large end of the pear-shaped aperture of the center layer, and concentric with the centrally disposed circular aperture of the third layer, the circular channel sized to permit a router spindle and collet to pass through; and
wherein the plurality of layers has a closed internal chamber described by the pear-shaped aperture disposed through the center layer, the interior face of the second layer, and the interior face of the third layer, the closed internal chamber having an inlet at one edge of the circular channel disposed through the plurality of layers, and the closed internal chamber having an exhaust duct disposed through the exterior face of the third layer near a corner of the third layer, the exhaust duct comprising the circular aperture disposed through the third layer near a corner of the third layer.

2. The combination router support plate and dust extractor of claim 1, wherein a plurality of bolt holes are disposed through the plurality of layers of the combination router support plate and dust extractor for mounting of a router.

3. The combination router support plate and dust extractor of claim 1, wherein the circular aperture of the third layer centrally disposed through the third layer has a diameter no more than 20% greater than the diameter of a collet of a mounted router.

4. The combination router support plate and dust extractor of claim 1, wherein the second layer and the third layer are further comprised of phenolic sheet.

5. The combination router support plate and dust extractor of claim 1, wherein the center layer is fabricated from manufactured wood.

6. The combination router support plate and dust extractor of claim 1, wherein the layers have dimensions of 210 mm×300 mm.

7. The combination router support plate and dust extractor of claim 1, wherein the layers have rounded corners of radius 19 mm.

8. The combination router support plate and dust extractor of claim 1, wherein the second layer and the third layer are 3.2 mm thick.

9. The combination router support plate and dust extractor of claim 1, wherein the center layer is 12.7 mm thick.

10. The combination router support plate and dust extractor of claim 1, wherein the circular aperture of the second layer centrally disposed through the second layer has a diameter of 50.8 mm.

11. The combination router support plate and dust extractor of claim 1, wherein the large end of the pear-shaped aperture of the center layer describes a circular arc having a diameter of 63.6 mm.

12. The combination router support plate and dust extractor of claim 1, wherein the circular aperture of the third layer centrally disposed through the third layer has a diameter of 19 mm.

13. The combination router support plate and dust extractor of claim 1, wherein the small end of the pear-shaped aperture of the center layer describes a circular arc having a diameter of 38.1 mm.

14. The combination router support plate and dust extractor of claim 1, wherein the circular aperture of the third layer disposed through the third layer near a corner of the third layer has a diameter of 38.1 mm.

15. A combination router support plate and dust extractor comprising:
a flat, generally rectangular center layer, wherein the center layer has a pear-shaped aperture disposed through the center layer, the pear-shaped aperture further comprising:
a large end of the pear-shaped aperture;
a small end of the pear-shaped aperture opposite the large end of the pear-shaped aperture;
wherein the large end of the pear-shaped aperture describes a circular arc having a diameter of 63.6 mm;
wherein the small end of the pear-shaped aperture describes a circular arc having a diameter of 38.1 mm;
wherein the circular arc described by the large end of the pear-shaped aperture forms a portion of a circle, said circle if fully circumscribed being a large circle centrally disposed through the layer;
wherein the circular arc described by the small end of the pear-shaped aperture forms a portion of a circle, said circle if fully circumscribed being a small circle disposed through the layer near a corner of the layer;
wherein the circular arc described by the large end of the pear-shaped aperture and the circular arc described by the small end of the pear-shaped aperture are joined by straight lines that complete the pear-shaped aperture;
wherein the pear-shaped aperture is symmetrical about an axis extending from the center of the circular arc described by the large end to the center of the circular arc described by the small end;
a flat, generally rectangular second layer disposed adjacent one side face of the center layer to follow the contour thereof, the second layer further comprising:
a circular aperture centrally disposed through the second layer concentric with the large circle partially formed by the circular arc described by the large end of the pear-shaped aperture of the center layer, the circular aperture having a diameter of 50.8 mm;
an interior face disposed adjacent the center layer;
an exterior face disposed opposite the face adjacent to the center layer;
a flat, generally rectangular third layer disposed adjacent the opposite side face of the center layer to follow the contour thereof, the third layer further comprising:
a circular aperture centrally disposed through the third layer concentric with the large circle partially formed by the circular arc described by the large end of the pear-shaped aperture of the center layer, the circular aperture having a diameter of 19 mm;
a circular aperture disposed through the third layer concentric with the small circle partially formed by the circular arc described by the small end of the pear-shaped aperture of the center layer, the circular aperture having a diameter of 38.1 mm;

an interior face disposed adjacent the center layer;

an exterior face disposed opposite the face adjacent to the center layer;

the second layer and the third layer further comprised of phenolic sheet;

the center layer further comprised of manufactured wood;

the plurality of layers having dimensions of 210 mm×300 mm;

the plurality of layers having rounded corners of radius 19 mm;

the second layer and the third layer having thickness of 3.2 mm;

the center layer having thickness of 12.7 mm;

the plurality of layers being machinable to permit mounting of a conventional woodworking router with a plurality of threaded fasteners to the exterior face of the third layer;

the third layer further permitting engagement to the exterior face of a connectable hose of a vacuum source, said engagement being concentric with the circular aperture disposed through the third layer concentric with the small circle partially formed by the circular arc described by the small end of the pear-shaped aperture of the center layer;

wherein a circular channel is disposed through the plurality of layers, the circular channel comprising the centrally disposed circular aperture of the second layer, concentric with the large circle partially formed by the circular arc described by the large end of the pear-shaped aperture of the center layer, and concentric with the centrally disposed circular aperture of the third layer, the circular channel sized to permit a router spindle and collet to pass through;

wherein the plurality of layers has a closed internal chamber described by the pear-shaped aperture disposed through the center layer, the interior face of the second layer, and the interior face of the third layer, the closed internal chamber having an inlet at one edge of the circular channel disposed through the plurality of layers, and the closed internal chamber having an exhaust duct disposed through the exterior face of the third layer near a corner of the third layer, the exhaust duct comprising the circular aperture disposed through the third layer near a corner of the third layer; and wherein a plurality of bolt holes are disposed through the plurality of layers of the combination router support plate and dust extractor for mounting of a conventional wordworking router.

\* \* \* \* \*